Aug. 3, 1943.  W. P. CANNING  2,325,740
LENS SURFACING DEVICE
Filed May 10, 1941
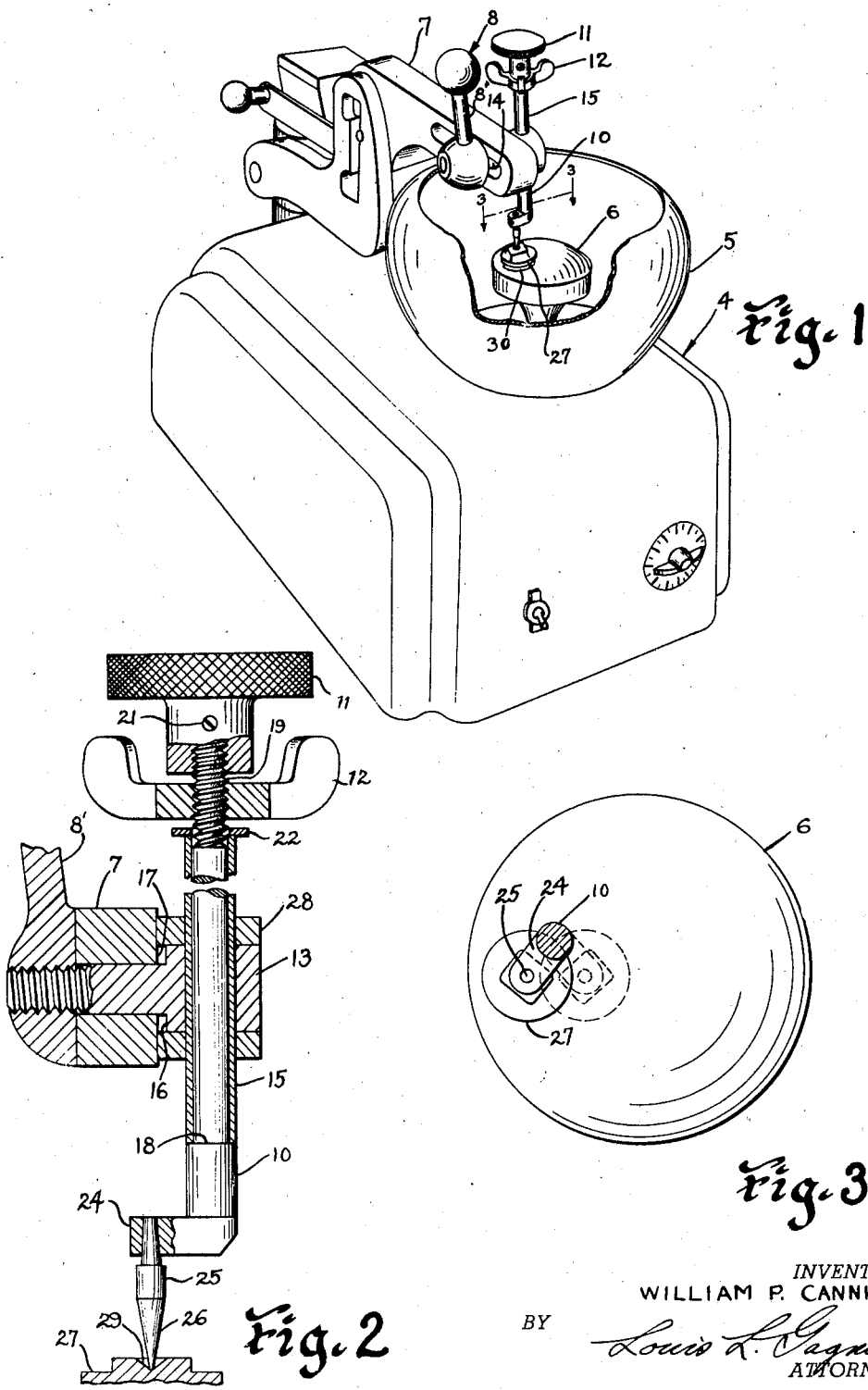
INVENTOR
WILLIAM P. CANNING
BY
Louis L. Gagnon.
ATTORNEY Patented Aug. 3, 1943

2,325,740

UNITED STATES PATENT OFFICE 2,325,740

LENS SURFACING DEVICE

William P. Canning, Southbridge, Mass., assignor to American Optical Company, Southbridge, Mass., a voluntary association of Massachusetts Application May 10, 1941, Serial No. 392,930

5 Claims. (Cl. 51—131)

This invention relates to improvements in surfacing machines and has particular reference to a machine for surfacing ophthalmic lenses or analogous work. More specifically this invention pertains to improvements in the type of surfacing or abrading machines as presented in more detail in the co-pending application of Lloyd W. Goddu, Serial No. 251,541. The assignee of the present application is the same as that of the Goddu application mentioned above.

It is an object of the invention to provide adjustment means on a surfacing machine by rotationally adjusting the spindle without varying the axial alignment of the spindle from its former position.

A further object of the invention is to provide means for holding the adjustable spindle in a predetermined longitudinal position and thereafter rotate the spindle to vary the distance between the center of the lens on the lap and the lens block.

It is a further object of the present invention to provide improved means for positioning the lens on the lens block laterally without changing the previous major position of the adjustable spindle.

A further object of the invention is to provide means for varying the general track of the random motion positional means about the axis of the driving pin spindle without changing the axial adjustment of the spindle per se.

A further object is to provide a means for retaining the axial alignment of the spindle in a predetermined position while varying the lens positioning means in relation to the lens block with a minimum of adjustment.

Other and further objects and advantages of the invention may be and may become apparent to one skilled in the art from a perusal of the following description, taken in connection with the accompanying drawing, and it will be apparent that many changes may be made in the details of construction and arrangement of parts without departing from the spirit of the invention as defined in the subjoined claims. It is to be understood that the presentation herewith is not to constitute a limitation since the disclosure made herewith is a preferred form only and is only shown for purpose of illustration.

Referring to the drawing:

Fig. 1 is a perspective view of a complete device, partially broken away, to show the lens block positional means in relation to the adjustable spindle which is carried by the support arm.

Fig. 2 is an enlarged view of the present invention, partially broken away and partially in section showing the details in construction.

Fig. 3 is an enlarged view taken along lines 3—3 of Fig. 1 to more clearly define the positional range of the adjustable spindle in relation to the lens lap.

Heretofore, machines of this general type had an adjustable spindle which was carried on a support arm and connected thereto by a locking clamp. In most prior art machines, the adjustable spindle was supported by a single clamp mechanism which loosened the spindle and changed the original spindle position when the lens block positional means was changed from one position on the lens lap to another position. The present invention has a separate locking means which permits the lens block position to be changed relative to the axis of the lens lap independently of the axial position of the spindle.

In ordinary operation, the operator of the machine sets the spindle and driving pin in a position which the machine operator believes is proper for accomplishing the particular job of grinding or polishing at hand. Upon inspection, the machine operator usually finds that the lens should be moved further away from, or nearer to the center of the lap. In the formerly used method, the loosening of the spindle clamping means released the previous adjustment of the spindle, and a new adjustment was made by observation. According to the present invention a separate adjusting means is provided so that once the spindle is properly axially aligned, a further adjustment may be made to change the position of the lens block in relation to the lap without varying the former axial position of the spindle per se. This is done simply by loosening a wing nut and turning a knob on the upper end of the spindle until the driving pin and its cooperative lens block are in the desired lateral position in relation to the lap. This simple adjustment will permit the machine operator to vary the general track of the random motion while the machine is running without losing the advantage of the previous adjustment. This feature was not possible heretofore.

The adjustment means comprises a sleeve which fits over a portion of the spindle so that the sleeve is gripped and held in fixed position in relation to the support arm locking mechanism while the spindle which is located within the sleeve may be freely rotated to any one of its various positions and thereafter locked in place by a separate locking means, which in the present instance is a wing nut that facilitates manipulation of the positional spindle adjustment means.

Referring to the drawing and more particularly to Fig. 1 a lens lapping or lens abrading machine 4 has a bowl 5 connected thereto with a lap 6 supported on a vertical drive shaft. The lap 6 is revolved by revolving the driving shaft by any convenient means such as is described in the aforesaid Goddu application. A support arm 7 carries a support arm locking mechanism 8, which locking mechanism grips the sleeve 15 to prevent said sleeve from rotating or moving in any direction in relation to the support arm. An adjustable spindle member 10 is rotatably mounted within the sleeve 15 by means of a knob 11, and said spindle means is locked therein by means of a wing nut 12 which prevents the spindle member from rotating within the sleeve 15. The support arm 7 is carried by the lens abrading machine for increasing the pressure on the lens while the lapping or abrading operation is in progress.

The detailed parts of the invention are shown used in combination with a machine of the type described in the aforesaid Goddu application. However, any machine may be used for controlling the pressure on the work during the surfacing operation so that the pressure on the lens will be substantially equal throughout all desirable portions of movement of the work or lens during the surfacing operation.

Referring to Fig. 2 the support arm 7 has a stud 13 insertable in and movable throughout the elongated slot 14 shown more in detail in Fig. 1. The threaded end of the stud 13 threadedly engages the screw portion of the handle 8' of the support arm locking mechanism 8. A collar 28 slips over the head of the stud 13, which collar and stud have holes therein to receive the sleeve 15. It will be noted that the inner shoulder 16 of the stud 13 head is spaced from the adjacent side surface 17 of the support arm 7. After the sleeve 15 has been inserted through the holes in the collar and stud 28 and 13 respectively the tightening of the support arm locking mechanism from manipulation of handle 8' will tend to cause the inner shoulder 16 to be drawn toward the adjacent support arm surface 17, thereby creating a binding action between the head of the stud 13 and the collar 28 causing the sleeve 15 to remain stationary once it is in a locked position.

When the sleeve 15 is locked the spindle 10 may be inserted therein. The lower end of the sleeve 15 engages the shoulder 18 while the portion of the spindle 10 having a reduced cross section area will slide through the sleeve and have secured on the threaded end 19 thereof the knob 11, which knob is secured to the threaded end of the spindle by means of a screw 21, which may be a pin or other fastening means. A washer 22 is placed on the threaded portion of the spindle 10 and rests on the upper end of the sleeve 15. The wing nut 12 is threadedly connected on the threaded portion of the spindle 10 and is used for the purpose of locking the spindle in a fixed position after the rotation of the knob 11 fixes the angular relation of the spindle so that it will be properly adjusted for positioning the lens block on the lens lap. The lower end of the spindle 10 has a laterally extending portion 24 which has a tapered aperture therein for receiving one end of the guide pin 25. The free end tapered portion 26 is adapted to engage the aperture 29 of the lens block 27 in a well known manner.

The disclosure in Fig. 3 shows the lens lap 6 having the spindle 10 carrying the laterally extending portion 24 which in turn supports the guide pin 25. The lens block 27 has a lens 30 (Fig. 1) which lens is secured to the lens block by pitch or other medium. The dotted portions shown in Fig. 3 represents the positional adjustment for the purpose of illustration to indicate the general range of movement of the lens block about the axis of the spindle 10 without changing the longitudinal axis of the spindle, since said spindle is held securely by the support arm locking mechanism, and the longitudinal portion of the spindle 10 may be only varied when the sleeve 15 is released by releasing the support arm locking mechanism 8 resulting from manipulation of the handle 8'.

From the foregoing, it will be seen that the random motion of the lens block 27 may have its general track or course, due to the gentle oscillation of the supporting arm 7, changed by rotationally adjusting the spindle as described in the aforementioned Goddu application. It is to be understood that while the present invention is shown in conjunction with a machine having an oscillating supporting arm, the invention may be used on any type of grinding, abrading, polishing or similar machine which can utilize the function of moving the lens block to a different radius in relation to the axis of the lap.

In commercial practice, the means employed may involve changes from the specific disclosure set forth herein and minor changes may readily suggest themselves. The right to make certain minor departures from the specifications and drawings is retained and equivalent parts may be used within the spirit of the invention as defined by the subjoined claims.

Having described my invention, I claim:

1. A surfacing machine of the class described a member having a bearing pivotally connected therewith, a sleeve in said bearing, means for clamping said sleeve in said bearing and for simultaneously locking said bearing against pivotal movement, a spindle rotatably mounted in said sleeve and having an offset work holding engaging portion and means for locking said spindle against rotation relative to said sleeve.

2. In a surfacing machine of the class described, adjustable means supporting a spindle having an offset work engaging portion, said spindle supporting means being adjustable in a direction longitudinally thereof and to different angular positions and being such as to retain said spindle against independent longitudinal movement, means for locking said spindle supporting means in position of adjustment, said spindle being rotatable in said spindle supporting means when said supporting means is locked in position of adjustment and means for locking said spindle against rotation relative to said spindle supporting means.

3. In a device of the character described for supporting work to be abraded, said device comprising a member having a bearing pivotally connected therewith, means for locking said bearing in different pivotal positions, means in said bearing for supporting a spindle having an offset work engaging portion, said means being adjustably supported in the bearing and being held in adjusted position by the means for locking said bearing in different adjusted positions, said spindle being rotatable to alter the position of the offset portion thereof without altering the adjusted position of the spindle supporting means and means for locking said spindle against rotary movement relative to said spindle supporting means.

4. In a surfacing machine of the class described a pivotally supported arm, a bearing connected with said arm for movement longitudinally of and for pivotal movement relative to said arm, a sleeve in said bearing for supporting a spindle having an offset work engaging portion, means for locking said sleeve and bearing in different positions of adjustment relative to the arm and means for locking said spindle against rotation relative to said sleeve.

5. In a device of the class described for producing relative motion between a work holder and a tool, a spindle having an offset portion for engaging the work holder, means for rotatably supporting said spindle, bearing means in which said spindle supporting means is slidably supported, said bearing means being pivotally supported for movement to different angular positions about the axis of said pivot, means for locking said bearing means in different angular positions and for simultaneously locking said spindle supporting means against longitudinal movement relative to said bearing means and means for locking the spindle against rotary movement relative to said spindle supporting means.

WILLIAM P. CANNING.